United States Patent [19]

Correa

[11] Patent Number: 5,373,692
[45] Date of Patent: Dec. 20, 1994

[54] RETROFITTABLE TRIM SYSTEM FOR FUEL-AIR OPTIMIZATION IN CANNULAR GAS TURBINE COMBUSTORS

[75] Inventor: Sanjay M. Correa, Schenectady, N.Y.

[73] Assignee: General Electric Company, Schenectady, N.Y.

[21] Appl. No.: 192,538

[22] Filed: Feb. 7, 1994

Related U.S. Application Data

[62] Division of Ser. No. 47,671, Apr. 19, 1993.

[51] Int. Cl.$^5$ .............................................. F02C 9/28
[52] U.S. Cl. ................................................... 60/39.06
[58] Field of Search .............. 60/39.06, 39.281, 39.5, 60/734, 739

[56] References Cited

U.S. PATENT DOCUMENTS 5,024,055  6/1991  Sato et al. .................. 60/39.281

FOREIGN PATENT DOCUMENTS 197726  9/1986  Japan ......................... 60/39.281

*Primary Examiner*—Louis J. Casaregola
*Attorney, Agent, or Firm*—Patrick R. Scanlon; Paul R. Webb, II

[57] ABSTRACT

A trim system reduces $NO_x$ output from a cannular gas turbine by trimming fuel flow rates to equalize the fuel-air ratio in each combustor can. The system includes a main valve fluidly connected to the fuel inlet of each can and a trim valve fluidly connected to each fuel inlet in parallel with the main valve. Each trim valve has a flow resistance which is about 30–100 times greater than the flow resistance of each main valve. A controller is provided for controlling the opening of the trim valves in response to the level of $NO_x$ emitted from the gas turbine. The controller receives a signal corresponding to the $NO_x$ emissions from a $NO_x$ sensor and outputs suitable control signals to the trim valves. In one preferred control scheme, the controller sequentially perturbs the fuel flow rate to each can and monitors the resulting changes in $NO_x$ emissions. The controller establishes influence coefficients for each combustor can which are defined as the ratio of the change in $NO_x$ output to the change in fuel flow rate to that can. Baseline fuel flow adjustments are then made in the direction of negative influence coefficients. This is continued until $NO_x$ emissions are minimized.

2 Claims, 2 Drawing Sheets

RETROFITTABLE TRIM SYSTEM FOR FUEL-AIR OPTIMIZATION IN CANNULAR GAS TURBINE COMBUSTORS

This application is a division of application Ser. No. 08/047,671, filed Apr. 19, 1993.

BACKGROUND OF THE INVENTION

This invention relates generally to fuel-air optimization in cannular gas turbine combustors and more particularly concerns a system for continual on-line trimming of the fuel flow rate to each can of a cannular combustor.

FIG. 1A shows a conventional gas turbine apparatus which includes a compressor 2, a combustor 3 and a turbine 4. Fuel is mixed with compressed air from the compressor 2 and burned in the combustor 3. The resulting flow of combustion products out of the combustor 3 drives the turbine 4 which in turn drives a generator 5 as well as the compressor 2. The exhaust from the turbine 4 is eventually released to the atmosphere. One type of combustor commonly used today is the so-called cannular combustor which comprises a plurality of separate cans, wherein each can is connected to the compressor 2 and the fuel supply and outputs to the turbine 4.

FIG. 1B schematically shows a single can 10 of a conventional cannular combustor. The can 10 defines a tubular combustion chamber 11 to which a fuel-air mixture from a premixer 12 is injected. Air at compressor discharge conditions enters the premixer 12 via an air line 13 and fuel enters via a fuel line 14. A main valve 15 is disposed in the fuel line 14 to throttle the flow of fuel into the premixer 12. Alternatively, the fuel and air may be directly injected into the combustion chamber 11 without premixing. This results in near-stoichiometric, high temperature combustion which leads to copious production of NO and $NO_2$ which are generally referred to as $NO_x$. Premixing the fuel and air prior to combustion results in lean premixed combustion which produces lower flame temperatures and thus lower $NO_x$ emissions.

Reducing emissions of harmful gases such as $NO_x$ into the atmosphere is of prime concern. Gas turbine-based power plants burning natural gas offer a means for dramatically reducing these emissions. Natural gas-fired gas turbines produce no measurable particulates or $SO_x$ and, if the combustion process is properly controlled, very little $NO_x$ or CO. $NO_x$ emissions are very sensitive to fuel-air ratio, increasing exponentially with respect to the fuel-air ratio. Because of the non-linear increase, total $NO_x$ emissions for a prescribed amount of total fuel can be minimized when the fuel-air ratio is the same in all cans of a cannular combustor. However, uniformity of air flow to each can cannot be controlled to better than 3-4% and the can-to-can variation is not known in real time. These uncontrollable can-to-can variations in air flow mean that unless individual can fuel inputs can be accurately controlled, the fuel-air ratios between cans will not be uniform and excess $NO_x$ will be produced.

Accordingly, there is a need for real time, on-line trimming of the fuel flow to each can of a cannular combustor in accordance with minimizing total $NO_x$ emissions. There is an additional need for a trim system to carry out the real time, on-line trimming which is retrofittable to existing cannular gas turbines. The trim system must be such that its failure will not affect the baseline operation of the gas turbine apparatus.

SUMMARY OF THE INVENTION

The above-mentioned needs are met by the present invention which provides a low $NO_x$ cannular gas turbine apparatus including a turbine and a compressor driven by the turbine and a $NO_x$ sensor positioned to sense the level of $NO_x$ emitted from the turbine. The gas turbine apparatus further includes a cannular combustor which comprises a plurality of combustor cans connected to receive compressed air from the compressor and to exhaust combustion products to the turbine. Each can comprises a fuel inlet, a first valve fluidly connected to the fuel inlet, and a second valve fluidly connected to the fuel inlet in parallel with the first valve. The second valve has a flow resistance which is about 30–100 times greater than the flow resistance of the first valve.

A controller is provided for controlling the opening of the second valves in response to the level of $NO_x$ emitted from the turbine. The controller receives a signal from the $NO_x$ sensor which corresponds to the $NO_x$ emissions and outputs suitable control signals to the second valves. In one preferred control scheme, the controller sequentially perturbs the baseline fuel flow rate to each of the cans and measures the resulting change in $NO_x$ emissions for each perturbation. The controller determines an influence coefficient for each combustor can which is defined as the ratio of the change in $NO_x$ emissions to the change in fuel flow rate to that can. The controller then makes baseline adjustments to the fuel flow rates in the direction of negative influence coefficients. This process of sequentially perturbing baseline fuel flow rates and making baseline adjustments in the direction of negative influence coefficients is continued until $NO_x$ emissions are minimized.

Other objects and advantages of the present invention will become apparent upon reading the following detailed description and the appended claims with reference to the accompanying drawings.

DESCRIPTION OF THE DRAWINGS

The subject matter which is regarded as the invention is particularly pointed out and distinctly claimed in the concluding part of the specification. The invention, however, may be best understood by reference to the following description taken in conjunction with the accompanying drawing figures in which:

DETAILED DESCRIPTION OF THE INVENTION

Figure 1A:
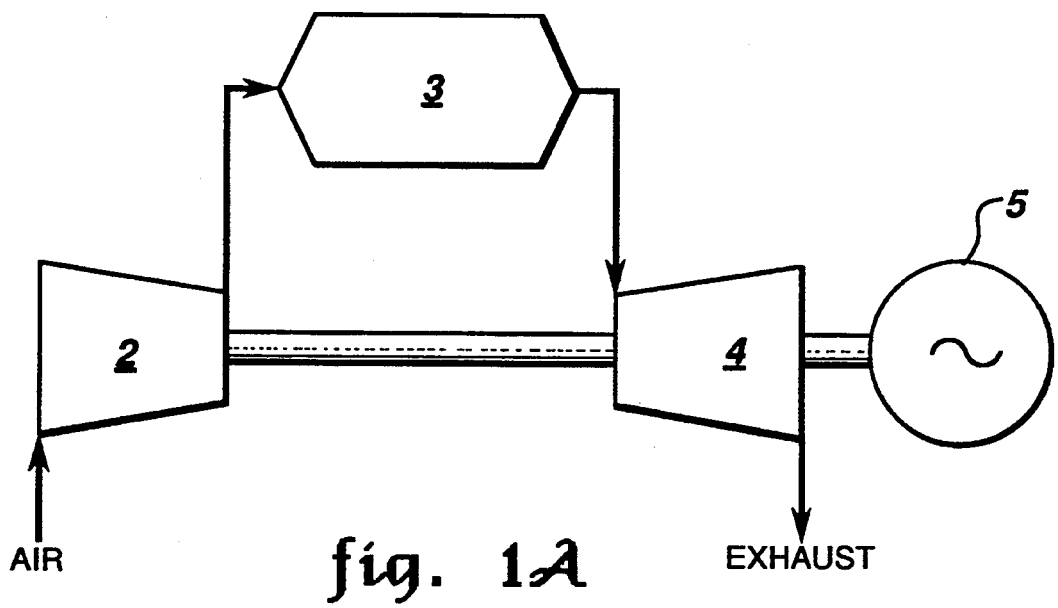
FIG. 1A is a schematic representation of a conventional gas turbine apparatus.
Figure 1B:
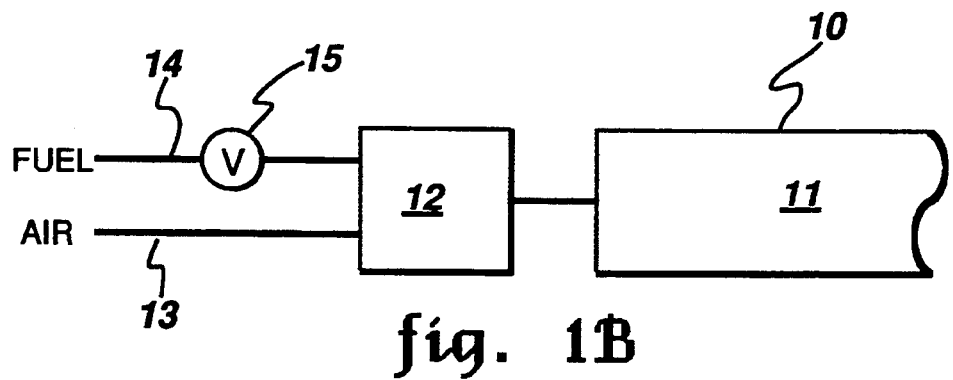
FIG. 1B is a schematic representation of a single can from a conventional cannular gas turbine combustor.
Figure 2:
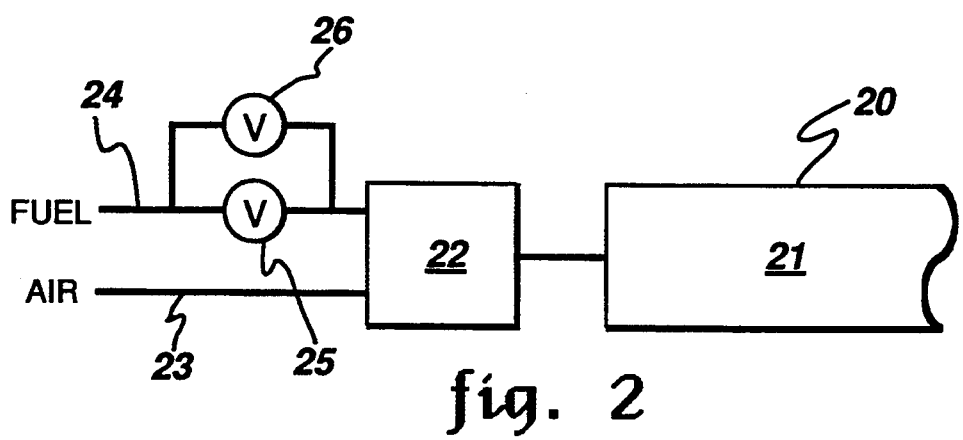
FIG. 2 is a schematic representation of a single can from the cannular gas turbine combustor of the present invention.

Referring to the drawings wherein identical reference numerals denote the same elements throughout the various views, FIG. 2 shows a single can 20 from the cannular gas turbine combustor of the present invention. The can 20 defines a tubular combustion chamber 21 to which a fuel-air mixture from a premixer 22 is injected. Air at compressor discharge conditions enters the premixer 22 via an air line 23 and fuel enters via a fuel line 24. A main valve 25 is disposed in the fuel line 24 to throttle the flow of fuel into the premixer 22. While FIG. 2 shows the fuel and air being premixed in the premixer 22, it should be noted that the present invention is applicable to both nonpremixed and premixed combustion.

Generally, a single valve cannot provide the fine adjustments to fuel flow necessary to equalize the can-to-can fuel-air ratios due to its mechanical limitations. That is, it is nearly impossible to accurately displace the valve stem of a valve the minute distances required to affect a small 1-3% change in the flow rate through the valve while ensuring fail-safe operation. The present invention provides better control over fuel flow than conventional systems through the provision of a trim valve 26. The trim valve 26 is disposed in the fuel line 24 in parallel with the main valve 25 and has resistance to flow which is much higher than that of the main valve 25. The total flow resistance $\rho$ for this parallel two valve arrangement is given by:

$$\rho = \frac{rR}{r+R} \quad (1)$$

where r is the resistance through the main valve 25 and R is the resistance through the trim valve 26. Given that $R >> r$, it can be seen that for a constant main valve resistance r, large changes in the trim valve resistance R produce minimal changes in the total resistance $\rho$. Thus, the inclusion of the parallel trim valve 26 allows for very precise control of fuel flow to the can 20 without requiring overly precise control of either valve.

The change in total flow $\delta I$ in response to changes in trim valve resistance $\delta R$ due to changes in the setting of the trim valve 26 can be calculated as:

$$\frac{\delta I}{I} = \frac{-\epsilon \delta R}{R} + O(\epsilon^2) \quad (2)$$

where the parameter $\epsilon$ is defined as the ratio r/R. Since $R >> r$, $\epsilon$ is very small and the error on the order of $\epsilon^2$ is negligible. The response is thus of the first order in the parameter $\epsilon$. Since fuel flow changes must be of the order of 1-3% to counter for the air flow fluctuations, $\epsilon$ must be in the range of 0.01-0.03, which means the the resistance R of the trim valve 26 must be about 30-100 times greater than the resistance r of the main valve 25. Furthermore, because the trim valve resistance R is so much larger than the main valve resistance r, the resulting total resistance $\rho$ is only slightly less than the main valve resistance r. Therefore, failure of the trim valve 26 would have a negligible effect on the baseline operation of the system.

Figure 3:
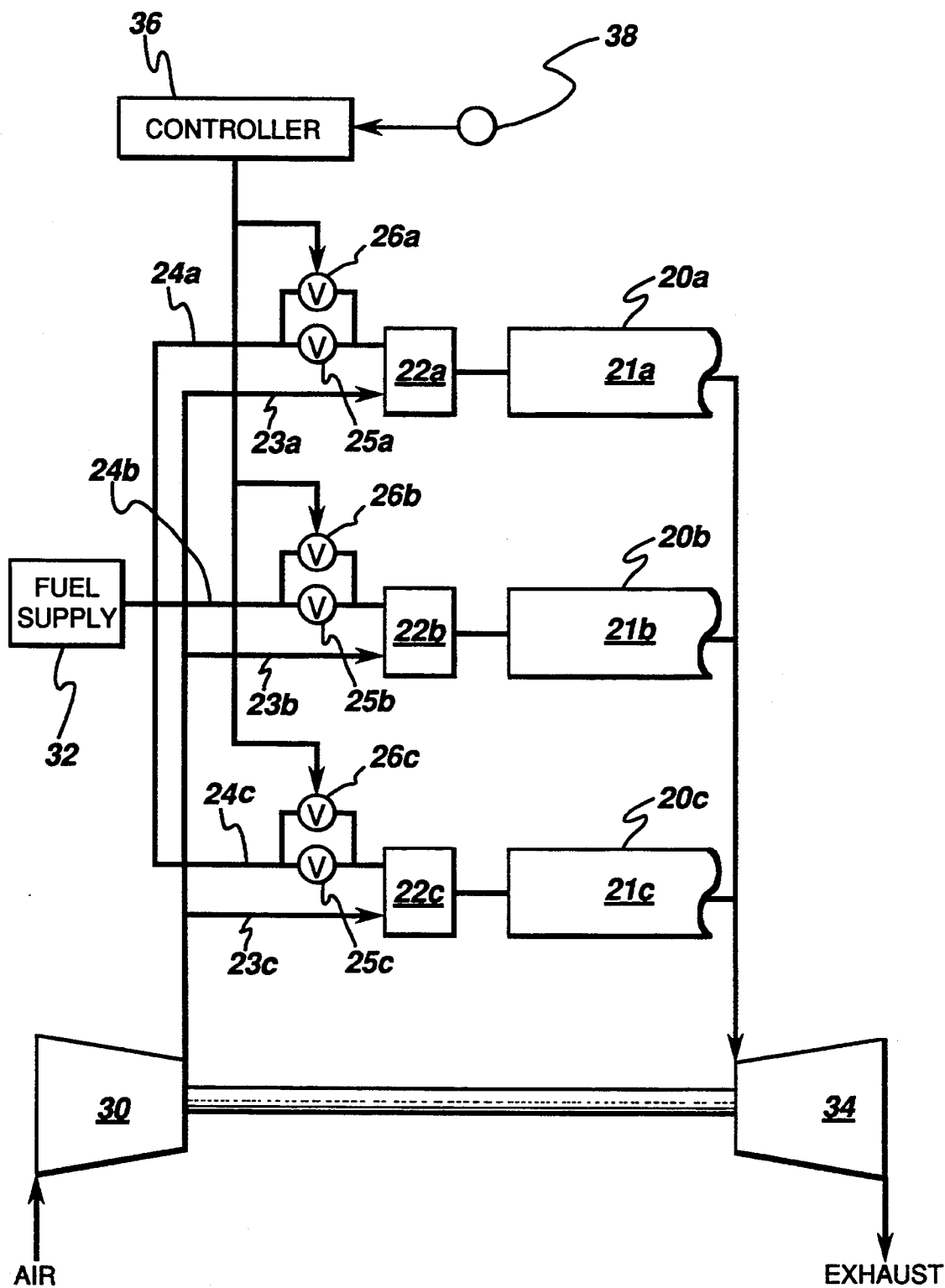
FIG. 3 is a schematic representation of the cannular gas turbine combustor of the present invention.

FIG. 3 schematically shows a cannular gas turbine apparatus of the present invention. The system of FIG. 3 employs a cannular combustor having a plurality of individual cans 20a,20b,20c. Although FIG. 3 shows three cans, this is only for purposes of illustration. Cannular combustors typically have many more cans; for large gas turbine-based power plants, as many as eighteen cans are not uncommon.

Each one of the combustor cans 20a,20b, 20c is essentially identical to the combustion can of FIG. 2. Thus, each can 20a,20b,20c has a tubular combustion chamber 21a, 21b, 21c, a premixer 22a, 22b, 22c, an air line 23a, 23b, 23c and a fuel line 24a,24b,24c, respectively. A main valve 25a,25b,25c is disposed in each fuel line 24a,24b,24c, respectively, to throttle the flow of fuel into the respective premixers 22a,22b,22c. A higher resistance trim valve 26a,26b,26c is also disposed in each fuel line 24a,24b,24c, respectively, in parallel with the respective main valves 25a,25b,25c. A compressor 30 is connected to each one of the air lines 23a,23b,23c for supplying compressed air to the respective premixers 22a,22b,22c. Similarly, a fuel supply 32 is connected to each one of the fuel lines 24a,24b,24c for supplying fuel to the respective premixers 22a,22b,22c. The combustion products from each combustion chamber 21a,21b,21c are directed to a turbine 34 to drive the turbine 34. The turbine 34 drives the compressor 30 and a generator (not shown).

A controller 36 is connected to each trim valve 26a,26b,26c for controlling the opening thereof in accordance with the total $NO_x$ emission measured by a $NO_x$ sensor 38. The $NO_x$ sensor 38 feeds a signal corresponding to the total $NO_x$ emission to the controller 36. The $NO_x$ sensor 38 is schematically shown in FIG. 3 but is typically located in the chimney of a power plant to best sense the total $NO_x$ emissions. Such sensors are well known in the art and are generally already present in power plants to provide emissions data for compliance monitoring by regulatory agencies.

The controller 36 optimizes the individual fuel flow rates to each can to achieve minimum $NO_x$ emissions for a prescribed total fuel flow. One preferred control scheme for conducting this optimization process is based on influence coefficient calculations. In this control scheme, the controller 36 first sets an initial set of baseline fuel flow rates for all of the cans. A good starting point is that the initial fuel flow rates to each can are all equal. The controller 36 then adjusts the trim valve of a first one of the cans to perturb the fuel flow rate to the first can by a predetermined amount $\Delta m$. The small amount $\Delta m$ is on the order of 1-3% of the original fuel flow rate. Since the total fuel flow to all of the cans is fixed, perturbing the fuel flow rate to one can accordingly alters the fuel flow rates to the other cans. For instance, if the initial equal fuel flow rate to each can is $m_o$ and the fuel flow rate to the first can is increased by the small amount $\Delta m$, then the fuel flow rate to the first can becomes $m_o + \Delta m$ and the fuel flow rate to the other cans becomes $m_o - \Delta m/(N-1)$, where N is the total number of cans.

The controller 36 monitors the changes in the total $NO_x$ registered by the sensor 38 due to the altered fuel flow rates and establishes an empirical influence coefficient for the first can. The influence coefficient is defined as the ratio $\Delta NO_x/\Delta m$ where $\Delta NO_x$ is the change in total $NO_x$ output registered by the sensor 38 and $\Delta m$ is the change in the fuel flow rate to the first can. The controller 36 then returns the fuel flow rate to the first can to its original value, which returns the fuel flow rates to the other cans to their original values. The controller 36 next perturbs the fuel flow rate to a second one of the cans by a small amount and establishes an influence coefficient for the second can. This is repeated for each one of the cans.

Once an influence coefficient has been established for each can, baseline fuel flow adjustments are made in the direction of negative influence coefficients to establish a new set of baseline fuel flow rates. That is, the fuel flow rate to each can is either increased or decreased depending on whether that can's influence coefficient is negative or positive, respectively. This is shown mathematically by the equation:

$$m_{n,i} = m_{o,i} - fC_i \quad (3)$$

where $m_{n,i}$ is the new fuel flow rate, $m_{o,i}$ is the original fuel flow rate, and $C_i$ is the influence coefficient. The subscript i denotes the $i^{th}$ can (where $i=1,...N$). The value f is a control constant which assures that the change in the fuel flow rate will be on the same order as the amount $\Delta m$ which is the amount the fuel flow rate was perturbed in determining the influence coefficient.

The process of sequentially perturbing fuel flow rates and establishing influence coefficients on a can-by-can basis is then repeated from the new set of fuel flow rates, and baseline adjustments are again made in the direction of negative influence coefficients. The over-rich cans become leaner and the too-lean cans become richer. This reduces $NO_x$ emissions because of the exponential dependence of $NO_x$ on the fuel-air ratio. The controller 36 continues to sequentially perturb fuel flow rates and make baseline adjustments in the direction of negative influence coefficients until the total $NO_x$ output measured by the sensor 38 is minimized. This happens when the change in total $NO_x$ output per change in fuel flow rate becomes minimal. The above approach is advantageous because it requires only one $NO_x$ sensor in the plant exhaust which is typically already present in the power plant. An approach sensing $NO_x$ produced by each can is not practical because individual $NO_x$ sensors for each can are not feasible.

The foregoing has described a system for continual on-line trimming of the fuel flow rate to each can of a cannular gas turbine combustor to minimize $NO_x$ emissions while assuring baseline operation in the event of failure of one or more of the trim valves, the controller or the $NO_x$ sensor. While specific embodiments of the present invention have been described, it will be apparent to those skilled in the art that various modifications thereto can be made without departing from the spirit and scope of the invention as defined in the appended claims.

What is claimed is:

1. A method of minimizing $NO_x$ emissions from a cannular gas turbine having a plurality of combustor cans, each can having a fuel inlet section, said method comprising the steps of:

providing each one of said plurality of combustor cans with a main fuel valve fluidly connected to the corresponding fuel inlet section and a trim fuel valve fluidly connected to the corresponding fuel inlet section in parallel with said main valve and having a greater flow resistance than said main valve;

sensing the $NO_x$ emissions from said cannular gas turbine; and controlling the opening of said trim valve in accordance with the level of $NO_x$ sensed.

2. The method of claim 1 wherein said step of controlling the opening of said trim valve in accordance with the level of $NO_x$ sensed comprises the steps of:

a) sequentially perturbing the fuel flow rate to each one of said plurality of combustor cans;

b) measuring the resulting change in $NO_x$ emissions for each perturbation in fuel flow rate;

c) determining an influence coefficient for each one of said plurality of combustor cans which is defined as the ratio of the change in $NO_x$ emissions caused by the perturbation in fuel flow rate to that combustor can to the perturbation in fuel flow rate to that combustor can;

d) increasing the fuel flow rate to any one of said plurality of combustor cans which has a negative influence coefficient and decreasing the fuel flow rate to any one of said plurality of combustor cans which has a positive influence coefficient; and e) repeating steps a)–d) until $NO_x$ emissions are minimized.

* * * * *